W. TETLEY,

Assignor, by mesne assignments, to E. F. UNDERHILL

FOLDING SEAT AND TABLE.

No. 10,065. Reissued Mar. 21, 1882.

WITNESSES

Franck L. Durand

R. M. Smith

INVENTOR

Wm Tetley by A. M. Smith

Attorney

UNITED STATES PATENT OFFICE.

WILLIAM TETLEY, OF PANA, ILLINOIS, ASSIGNOR, BY MESNE ASSIGNMENTS, TO EDWARD F. UNDERHILL, OF NEW YORK, N. Y.

FOLDING SEAT AND TABLE.

SPECIFICATION forming part of Reissued Letters Patent No. 10,065, dated March 21, 1882.

Original No. 155,901, dated October 13, 1874. Application for reissue filed January 21, 1882.

*To all whom it may concern:*

Be it known that I, WILLIAM TETLEY, of Pana, in the county of Christian and State of Illinois, did invent certain new and useful Improvements in Folding Seats and Tables, of which the following is a full and exact description, reference being had to the accompanying drawings, making a part of this specification.

My invention relates to a novel construction of folding seats and tables, and of the floor or support therefor, whereby said seats or tables, either or both, are adapted to be folded out of the way into recesses or receptacles formed therefor in the supporting-floor, for leaving the latter clear and unobstructed when the seats are not in use, and is particularly designed for use in theaters and other public halls or buildings, for facilitating the clearing of the floor to permit ready egress of the audience, and for other purposes; but it will be apparent that it may be used elsewhere, wherever, for any cause, it is desirable to clear the floor of obstructing chairs or tables.

The invention consists in the combination, with a recessed floor, of a seat or table adapted to be folded into the recess or receptacle in said floor; in providing covers for the recesses in the floor, adapted, when the seats or tables are folded therein, to cover the recesses, be flush with and form part of the floor, and in certain details of construction and arrangement of parts hereinafter fully described.

Figure 1:
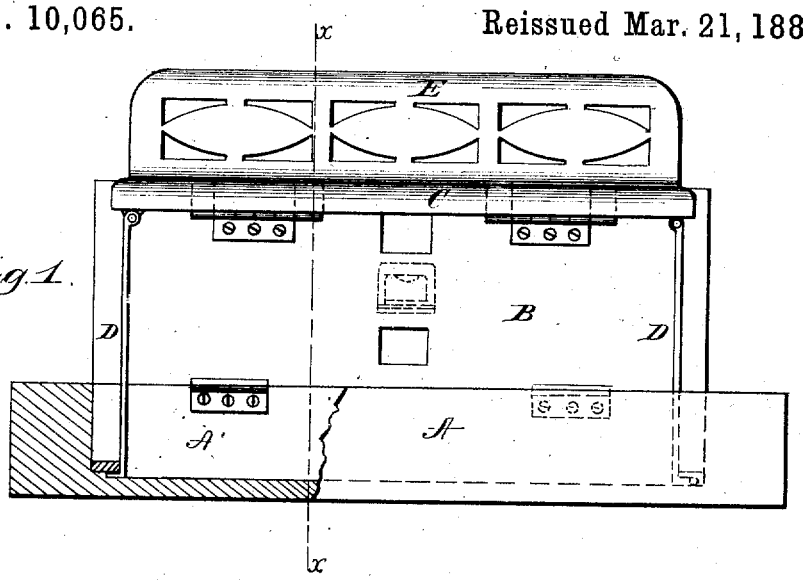
Figure 2:
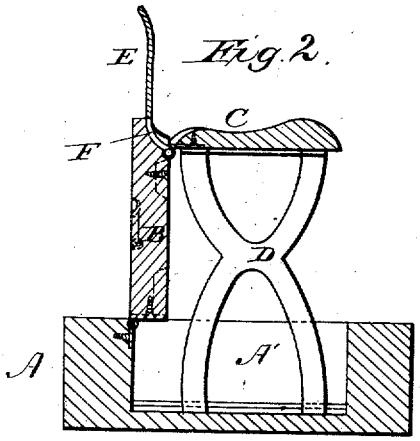

In the accompanying drawings, Figure 1 represents a front elevation of a seat with a portion of the floor partly in section, showing how my invention may be carried out in practice; and Fig. 2 is a vertical transverse section of the same, taken on the line *x x*, Fig. 1.

A represents the floor, and A′ the recess or pocket formed therein for the reception of the seat when not in use.

B is a cover to the recess when folded down therein. It also serves as a part of the support for the seat or table when the latter is raised into position for use, the table-top or the seat C being hinged to it.

D represents the legs, which are hinged to the table or seat in such manner as to adapt them to be folded under it when the latter is folded into the recess.

E is the back to the seat, hinged thereto and to the cover B in such manner as to adapt it to fold down upon the seat, and so arranged, in connection with the cover, as to be braced by the latter when the seat is in use. To this end the inner edge of the cover is by preference grooved or cut away, so as to extend above the hinged lower edge of the back, and thus form a support for the latter.

In folding the seat for clearing the floor the legs D D fold under the seat, the back folding upon the latter, and said parts fold together under the cover B, which, being folded down over them into the recess A′, fills and covers the latter, and, being flush on its upper face with the floor when thus folded, forms a part of said floor.

Having now described how my invention may be carried out in practice, what I claim as new is—

1. A recessed floor, in combination with a folding seat or table secured to said floor and adapted to be folded into a recess therein.

2. A recessed floor, in combination with a folding seat hinged thereto, and provided with folding legs or supports and a folding back, adapted to be folded with the seat into a recess in said floor.

3. The combination, with a recessed floor and a folding seat hinged thereto and adapted to be folded into a recess in said floor, of a cover folding into the recess and covering said seat and recess, and forming a part of the floor when thus folded.

4. The combination, with a seat adapted to fold into a recess in the floor, of a cover to said recess, forming a part of the floor when folded into said recess and a part of the seat when the latter is raised into position for use.

5. The combination, with the recessed floor, of the hinged cover B, hinged back E, and seat C, said cover being adapted to support the back when the latter is elevated for use, substantially as described.

In testimony whereof I have hereunto set my hand this 16th day of January, 1882.

WILLIAM TETLEY.

Witnesses:
CHAS. NADENBUSH,
JOSEPH B. WHITE.